(12) United States Patent
Rosenberg

(10) Patent No.: US 7,917,148 B2
(45) Date of Patent: Mar. 29, 2011

(54) SOCIAL MUSICAL MEDIA RATING SYSTEM AND METHOD FOR LOCALIZED ESTABLISHMENTS

(75) Inventor: Louis B. Rosenberg, Pismo Beach, CA (US)

(73) Assignee: Outland Research, LLC, Pismo Beach, CA (US)

(*) Notice: Subject to any disclaimer, the term of this patent is extended or adjusted under 35 U.S.C. 154(b) by 778 days.

(21) Appl. No.: 11/871,966

(22) Filed: Oct. 12, 2007

(65) Prior Publication Data

US 2008/0032723 A1 Feb. 7, 2008

Related U.S. Application Data

(63) Continuation-in-part of application No. 11/533,037, filed on Sep. 19, 2006, now Pat. No. 7,562,117, and a continuation-in-part of application No. 11/676,298, filed on Feb. 18, 2007, and a continuation-in-part of application No. 11/744,879, filed on May 6, 2007.

(60) Provisional application No. 60/920,507, filed on Mar. 27, 2007, provisional application No. 60/902,978, filed on Feb. 22, 2007, provisional application No. 60/720,071, filed on Sep. 23, 2005, provisional application No. 60/897,555, filed on Jan. 26, 2007.

(51) Int. Cl.
*H04Q 7/20* (2006.01)
(52) U.S. Cl. .................... 455/446; 455/414.1
(58) Field of Classification Search .......... None
See application file for complete search history.

(56) References Cited

U.S. PATENT DOCUMENTS

| 4,018,121 A | 4/1977 | Chowning |
| 4,054,749 A | 10/1977 | Suzuki |
| 4,091,302 A | 5/1978 | Yamashita |
| 4,360,345 A | 11/1982 | Hon |

(Continued)

FOREIGN PATENT DOCUMENTS

DE 19650900 6/1998

(Continued)

OTHER PUBLICATIONS

Non Final Office Action from U.S. Appl. No. 11/223,368, mailed Dec. 24, 2008.

(Continued)

*Primary Examiner* — Phuoc Doan
(74) *Attorney, Agent, or Firm* — Thomas F. Lebens; Sinsheimer Juhnke Lebens & McIvor, LLP

(57) ABSTRACT

A method and system are provided for enabling users in shared physical places to collaboratively rate the music playing within such places by using portable computing devices on their person. In one embodiment, the portable computing devices are mobile phones and each user may independently rate a currently playing musical piece within the physical place by sending an electronic message from their phone, for example in SMS format. The method and system further enables the receipt of a plurality of such rating messages, the computing of a statistical result, and the providing of the statistical result to each of the plurality of portable computing devices. In this way a group of people may collectively listen to a currently playing musical piece in a physical place, may each provide a subjective rating of the musical piece, and may each receive an indication of the collaborative result of the provided ratings.

18 Claims, 5 Drawing Sheets

U.S. PATENT DOCUMENTS

| | | |
|---|---|---|
| 4,430,595 A | 2/1984 | Nakasone |
| 4,490,810 A | 12/1984 | Hon |
| 4,712,101 A | 12/1987 | Culver |
| 4,823,634 A | 4/1989 | Culver |
| 4,868,549 A | 9/1989 | Affinito |
| 4,907,973 A | 3/1990 | Hon |
| 4,983,901 A | 1/1991 | Lehmer |
| 5,164,530 A | 11/1992 | Iwase |
| 5,185,561 A | 2/1993 | Good |
| 5,186,629 A | 2/1993 | Rohen |
| 5,189,355 A | 2/1993 | Larkins |
| 5,220,260 A | 6/1993 | Schuler |
| 5,273,038 A | 12/1993 | Beavin |
| 5,296,846 A | 3/1994 | Ledley |
| 5,296,871 A | 3/1994 | Paley |
| 5,359,527 A | 10/1994 | Takanabe |
| 5,442,557 A | 8/1995 | Kaneko |
| 5,534,917 A | 7/1996 | MacDougall |
| 5,559,412 A | 9/1996 | Schuler |
| 5,572,201 A | 11/1996 | Graham et al. |
| 5,614,687 A | 3/1997 | Yamada et al. |
| 5,629,594 A | 5/1997 | Jacobus |
| 5,643,087 A | 7/1997 | Marcus |
| 5,666,138 A | 9/1997 | Culver |
| 5,701,140 A | 12/1997 | Rosenberg |
| 5,704,791 A | 1/1998 | Gillio |
| 5,709,219 A | 1/1998 | Chen |
| 5,721,566 A | 2/1998 | Rosenberg |
| 5,724,264 A | 3/1998 | Rosenberg |
| 5,728,960 A | 3/1998 | Sitrick |
| 5,731,804 A | 3/1998 | Rosenberg |
| 5,734,373 A | 3/1998 | Rosenberg |
| 5,739,811 A | 4/1998 | Rosenberg |
| 5,742,278 A | 4/1998 | Chen |
| 5,747,714 A | 5/1998 | Kniest et al. |
| 5,754,023 A | 5/1998 | Roston |
| 5,755,577 A | 5/1998 | Gillio |
| 5,767,839 A | 6/1998 | Rosenberg |
| 5,769,640 A | 6/1998 | Jacobus |
| 5,791,908 A | 8/1998 | Gillio |
| 5,800,177 A | 9/1998 | Gillio |
| 5,800,178 A | 9/1998 | Gillio |
| 5,821,920 A | 10/1998 | Rosenberg |
| 5,825,308 A | 10/1998 | Rosenberg |
| 5,828,197 A | 10/1998 | Martin |
| 5,857,939 A | 1/1999 | Kaufman |
| 5,882,206 A | 3/1999 | Gillio |
| 5,889,670 A | 3/1999 | Schuler |
| 5,889,672 A | 3/1999 | Schuler |
| 5,897,437 A | 4/1999 | Nishiumi |
| 5,928,248 A | 7/1999 | Acker |
| 5,952,596 A | 9/1999 | Kondo |
| 5,959,613 A | 9/1999 | Rosenberg |
| 6,024,576 A | 2/2000 | Moore |
| 6,088,017 A | 7/2000 | Tremblay |
| 6,096,004 A | 8/2000 | Megland |
| 6,106,301 A | 8/2000 | Merril |
| 6,111,577 A | 8/2000 | Ziles |
| 6,122,520 A | 9/2000 | Want |
| 6,154,201 A | 11/2000 | Levin et al. |
| 6,160,489 A | 12/2000 | Perry |
| 6,211,861 B1 | 4/2001 | Rosenberg et al. |
| 6,221,861 B1 | 4/2001 | Seegmiller |
| 6,244,742 B1 | 6/2001 | Yamada |
| 6,248,946 B1 | 6/2001 | Dwek |
| 6,256,011 B1 | 7/2001 | Culver |
| 6,298,323 B1 | 10/2001 | Kaemmerer |
| 6,300,938 B1 | 10/2001 | Culver |
| 6,304,520 B1 | 10/2001 | Watanabe |
| 6,314,094 B1 | 11/2001 | Boys et al. |
| 6,323,412 B1 | 11/2001 | Loo |
| 6,366,272 B1 | 4/2002 | Rosenberg |
| 6,376,971 B1 | 4/2002 | Pelrine |
| 6,401,027 B1 | 6/2002 | Xu et al. |
| 6,411,896 B1 | 6/2002 | Shuman et al. |
| 6,429,846 B2 | 8/2002 | Rosenberg |
| 6,470,207 B1 | 10/2002 | Simon |
| 6,470,302 B1 | 10/2002 | Cunningham |
| 6,498,982 B2 | 12/2002 | Bellesfield et al. |
| 6,501,420 B2 | 12/2002 | Townsend |
| 6,563,487 B2 | 5/2003 | Martin |
| 6,598,707 B2 | 7/2003 | Nakagaki et al. |
| 6,636,835 B2 | 10/2003 | Ragsdale-Elliott et al. |
| 6,655,817 B2 | 12/2003 | Devlin |
| 6,665,644 B1 | 12/2003 | Kanevsky et al. |
| 6,686,531 B1 | 2/2004 | Pennock et al. |
| 6,686,911 B1 | 2/2004 | Levin |
| 6,697,044 B2 | 2/2004 | Shahoian |
| 6,721,706 B1 | 4/2004 | Strubbe et al. |
| 6,735,568 B1 | 5/2004 | Buckwalter et al. |
| 6,749,537 B1 | 6/2004 | Hickman |
| 6,768,066 B2 | 7/2004 | Wehrenberg |
| 6,768,246 B2 | 7/2004 | Pelrine |
| 6,772,026 B2 | 8/2004 | Bradbury et al. |
| 6,778,226 B1 | 8/2004 | Eshelman et al. |
| 6,801,837 B2 | 10/2004 | Carlstedt et al. |
| 6,804,643 B1 | 10/2004 | Kiss |
| 6,808,472 B1 | 10/2004 | Hickman |
| 6,812,394 B2 | 11/2004 | Weissflog |
| 6,812,624 B1 | 11/2004 | Pei et al. |
| 6,816,711 B2 | 11/2004 | Standke |
| 6,819,267 B1 | 11/2004 | Edmark |
| 6,822,635 B2 | 11/2004 | Shahoian |
| 6,858,970 B2 | 2/2005 | Malkin |
| 6,863,220 B2 | 3/2005 | Selker |
| 6,867,733 B2 | 3/2005 | Sandhu |
| 6,871,142 B2 | 3/2005 | Kumada et al. |
| 6,882,086 B2 | 4/2005 | Kornbluh |
| 6,885,362 B2 | 4/2005 | Suomela |
| 6,921,351 B1 | 7/2005 | Hickman |
| 6,929,481 B1 | 8/2005 | Alexander |
| 6,956,538 B2 | 10/2005 | Moore |
| 6,970,088 B2 | 11/2005 | Kovach |
| 6,982,697 B2 | 1/2006 | Wilson |
| 6,983,139 B2 | 1/2006 | Dowling et al. |
| 6,985,143 B2 | 1/2006 | Pharr |
| 6,986,320 B2 | 1/2006 | Shelton |
| 7,023,423 B2 | 4/2006 | Rosenberg |
| 7,100,835 B2 | 9/2006 | Selker |
| 7,133,767 B2 | 11/2006 | Ogino et al. |
| 7,136,945 B2 | 11/2006 | Gibbs et al. |
| 7,562,117 B2 | 7/2009 | Rosenberg |
| 7,613,531 B2 | 11/2009 | Korst et al. |
| 7,720,686 B2 | 5/2010 | Volk et al. |
| 7,729,945 B1 | 6/2010 | Katz et al. |
| 7,765,326 B2 | 7/2010 | Robbin et al. |
| 2002/0054060 A1 | 5/2002 | Schena |
| 2002/0091848 A1 | 7/2002 | Agresta et al. |
| 2002/0123988 A1 | 9/2002 | Dean |
| 2002/0133418 A1 | 9/2002 | Hammond et al. |
| 2002/0142701 A1 | 10/2002 | Rosenberg |
| 2002/0186221 A1 | 12/2002 | Bell |
| 2002/0198660 A1 | 12/2002 | Lutter et al. |
| 2003/0047683 A1 | 3/2003 | Kaushal |
| 2003/0069077 A1 | 4/2003 | Korienek |
| 2003/0110038 A1 | 6/2003 | Sharma |
| 2003/0210806 A1 | 11/2003 | Yoichi et al. |
| 2004/0015714 A1 | 1/2004 | Abraham et al. |
| 2004/0017482 A1 | 1/2004 | Weitman |
| 2004/0059708 A1 | 3/2004 | Dean |
| 2004/0097806 A1 | 5/2004 | Hunter |
| 2004/0117306 A1 | 6/2004 | Karaoguz et al. |
| 2004/0124248 A1 | 7/2004 | Selker |
| 2004/0164971 A1 | 8/2004 | Hayward |
| 2004/0166937 A1 | 8/2004 | Rothschild |
| 2004/0224638 A1 | 11/2004 | Fadell et al. |
| 2004/0225519 A1 | 11/2004 | Martin |
| 2004/0225635 A1 | 11/2004 | Toyama |
| 2005/0032528 A1 | 2/2005 | Dowling et al. |
| 2005/0060299 A1 | 3/2005 | Filley |
| 2005/0080786 A1 | 4/2005 | Fish |
| 2005/0096047 A1 | 5/2005 | Haberman et al. |
| 2005/0107688 A1 | 5/2005 | Strommer |
| 2005/0114149 A1 | 5/2005 | Rodriguez |
| 2005/0139660 A1 | 6/2005 | Maxymych et al. |
| 2005/0149213 A1 | 7/2005 | Guzak et al. |
| 2005/0154636 A1 | 7/2005 | Hildinger et al. |

| | | | |
|---|---|---|---|
| 2005/0174975 A1 | 8/2005 | Mgrdechian et al. | |
| 2005/0177614 A1 | 8/2005 | Bourne | |
| 2005/0212749 A1 | 9/2005 | Marvit et al. | |
| 2005/0227712 A1 | 10/2005 | Estevez | |
| 2005/0251576 A1 | 11/2005 | Weel | |
| 2005/0286546 A1 | 12/2005 | Basseli et al. | |
| 2006/0017692 A1 | 1/2006 | Wehrenberg et al. | |
| 2006/0022955 A1 | 2/2006 | Kennedy | |
| 2006/0026521 A1 | 2/2006 | Hotelling et al. | |
| 2006/0031551 A1* | 2/2006 | Agresta et al. | 709/231 |
| 2006/0095331 A1 | 5/2006 | O'Malley et al. | |
| 2006/0161621 A1 | 7/2006 | Rosenberg | |
| 2006/0167576 A1 | 7/2006 | Rosenberg | |
| 2006/0167943 A1 | 7/2006 | Rosenberg | |
| 2006/0189386 A1 | 8/2006 | Rosenberg | |
| 2006/0195361 A1 | 8/2006 | Rosenberg | |
| 2006/0212478 A1* | 9/2006 | Plastina et al. | 707/104.1 |
| 2006/0253210 A1 | 11/2006 | Rosenberg | |
| 2007/0125852 A1 | 6/2007 | Rosenberg | |
| 2007/0135264 A1 | 6/2007 | Rosenberg | |
| 2007/0156676 A1 | 7/2007 | Rosenberg | |
| 2007/0161382 A1 | 7/2007 | Melinger et al. | |

FOREIGN PATENT DOCUMENTS

WO    WO2006086439    8/2006

OTHER PUBLICATIONS

Notice of Allowance from U.S. Appl. No. 11/533,037 mailed Apr. 30, 2009.
Office Action from U.S. Appl. No. 11/282,379 dated Sep. 18, 2007.
Office Action from U.S. Appl. No. 11/422,065 dated Mar. 28, 2007.
Office Action from U.S. Appl. No. 11/422,065 dated Aug. 31, 2007.
"Beat rates per minute", downloaded from www.bpmlist.com on Jun. 27, 2006, Lulu Publishing. ISBN 1-4116-4211-2 Jun. 27, 2006.
"Bodybug Calorie Management System", downloaded from www.ubergizmo.com/15/archives/2005/03/boddybug_calori.html on Jul. 9, 2007 Mar. 18, 2005.
"Dialogr", http://www.dialogr.com/PostThought.cfm?/TopicId=684, first printed May 22, 2007.
"Human Metrics: Jung Typology Test", available at: http://www.humanmetrics.com/cgi-win/JTypes2.asp last visited Jun. 15, 2007 Jun. 15, 2007.
"PCDJ Red Virtual Rack Module", by Visiosonic of Clearwater, Fl. Downloaded from www.visiosonic.com on Jun. 27, 2006 Jun. 27, 2006.
"Remotely Operated Vehicle", www.seabotix.com/products/lbv150.htm Dec. 2001.
"Remotely Operated Vehicles Seaeye Falcon", www.roperresources.com May 2002.
"Tune Your Run", *Apple Computer/Nike,* downloaded from www.apple.com on Jun. 28, 2006 Jun. 28, 2006.
"Unmanned Aircraft Systems", www.baiaerosystems.com 1985.
"www.confluence.org", first visited May 2005 May 2005.
"www.fitlinxx.com", downloaded from www.fitlinxx.com/brand/about_tour3.htm on Jul 9, 2007 2003.
"www.gesturetek.com", Jul. 1996.
"www.reactrix.com", 2002.
"www.wwmx.org", First visited in May 2005 May 2005.
"Yahoo media player", downloaded from www.yahoo.com on Sep. 19, 2006. Not admitted as prior art. Sep. 19, 2006.
"YMCA", downloaded from www.ymcamidpen.org/textpage.php?b=2&p=fitlinxx on Jul. 10, 2007 2003.
Abrial, et al., "A New Contactless Smartcard IC Using an On-Chip Antenna and an Asynchronous Micro-controller", 2001.
Betlyon, Jim et al., "Omni Fitness Equipment Stores Integrate Physical Genius Online Fitness Tools", downloaded from www.physicalgenius.com on Aug. 5, 2007 Apr. 19, 2000.
Brin and Page, et al., "The Anatomy of a Large-Scale Hypertextual Search Engine", *Stanford University,* 1998 1998.
Castrillon, et al., "Identity and Gender Recognition Using the ENCARA Real-Time Face Detector", *CAEPIA* Nov. 2003.
Cook, Perry et al., "Using DSP-Based Parametric Physical Syntheses Models to Study Human Sound Perception", *2003 IEEE Workshop on Applications of Signal Processing to Audio and Acoustics* 2003.
Demartini, Marilyn et al., "Cyber Fitness", downloaded from www.physicalmag.com/articlesTemp.as?dept=14&articleID=1812 on Jul. 10, 2007 Feb. 18, 2001.
Gordon, et al., "Silicon Optical Navigation", 2003.
Hayashi, J et al., "A Method for Estimating and Modeling Age and Gender Using Facial Image Processing", 2001.
Kawahara, et al., "Designing a Universal Remote Control for the Ubiquitous Computing Environment", *EE Times,* 2003 2003.
Kornbluh, et al., "High-field Electrostriction of Elastomeric Polymer Dielectrics for Actuation", *SPIE Conference on Electroactive Polymer Actuators and Devices* Mar. 1999.
Lumia, R et al., "Microgripper design using electo-active polymers", *SPIE Conference on Electroactive Polymer Actuators and Devices, SPEE* vol. 3669, 1999 Mar. 1999.
McKinney and Moelants, et al., "Deviations from the Resonance Theory of Temp Induction", *published at the Conference on Interdisciplinary Musicology* et al = Dirk Moelands 2004.
McKinney and Moelants, et al., "Extracting the Perceptual Tempo from Music", *published at the ISMIR 2004 5th International Conference on Music Information Retrieval* 2004.
Metzger, Christian et al., "FreeDigiter: A Contact-free Device for Gesture Control", *IEEE 8th International Symposium on Wearable Computers* Nov. 4, 2004.
Morhring, et al., "Video See-Through AR on Consumer Cell-Phones", Mar. 2004.
Munro, Aria et al., "eNewsChannels", downloaded from enewschannels.com/20070106enc582-025321.php on Aug. 5, 2007 Jul. 1, 2007.
Murray, et al., "Underwater Teleroboticsa and Virtual Reality: A New Partnership", *NCCOSC RDT& E Division;* Jun. 20, 1996; pp. 1-10; San Diego, CA Jun. 20, 1996 , 1-10.
Nintendo, et al., "Kirby's Tilt N' Tumble", downloaded from www.nintendo.com; Nov. 14, 2006; 2 pages Nov. 14, 2006 , 2 pages.
Oguro, K et al., "Polymer Electrolyte Actuator with Gold Electrodes", *SPIE Conference on Electroactive Polymer Actuators and Devices, SPEE* vol. 3669, 1999 1999.
Oliver, Nuria et al., "Enhancing Exercise Performance through Real-time Phsiological Monitoring and Music: A User Study", *Proceedings of Pervasive Health 2006.* Innsbruck, Austria. Nov. 2006 et all = Lucas Kreger-Stckles Nov. 2006.
Reinhold, Ross et al., "Applications of Myers-Briggs Type Indicator, Personality Type", available at http://www.personalitypathways.com/ last visited Jun. 15, 2007 Jun. 15, 2007.
Rosenberg, et al., U.S. Appl No 11/223,368, filed Sep. 9, 2005.
Rosenberg, et al., U.S. Appl. No. 11/246,050, filed Feb. 8, 2007.
Rosenberg, et al., U.S. Appl. No. 11/260,000, filed Oct. 26, 2005.
Rosenberg, et al., U.S. Appl. No. 11/267,079, filed Nov. 3, 2005.
Rosenberg, et al., U.S. Appl. No. 11/278,120, filed Oct. 5, 2006.
Rosenberg, et al., U.S. Appl. No. 11/278,531, filed Apr. 3, 2006.
Rosenberg, et al., U.S. Appl. No. 11/282,379, filed Aug. 17, 2006.
Rosenberg, et al., U.S. Appl. No. 11/285,534, filed Nov. 22, 2005.
Rosenberg, et al., U.S. Appl. No. 11/298,434, filed Dec. 9, 2005.
Rosenberg, et al., U.S. Appl. No. 11/298,797, filed Aug. 3, 2006.
Rosenberg, et al., U.S. Appl. No. 11/299,096, filed Dec. 9, 2005.
Rosenberg, et al., U.S. Appl. No. 11/315,755, filed Dec. 21, 2005.
Rosenberg, et al., U.S. Appl. No. 11/315,762, filed Dec. 21, 2005.
Rosenberg, et al., U.S. Appl. No. 11/341,021, filed Aug. 3, 2006.
Rosenberg, et al., U.S. Appl. No. 11/341,025, filed Jan. 27, 2006.
Rosenberg, et al., U.S. Appl. No. 11/341,100, filed Jan. 27, 2006.
Rosenberg, et al., U.S. Appl. No. 11/341,948, filed Jan. 27, 2006.
Rosenberg, et al., U.S. Appl. No. 11/344,612, filed Nov. 16, 2006.
Rosenberg, et al., U.S. Appl. No. 11/344,613, filed Jan. 31, 2006.
Rosenberg, et al., U.S. Appl. No. 11/344,701, filed Jan. 31, 2006.
Rosenberg, et al., U.S. Appl. No. 11/383,195, filed Aug. 10, 2006.
Rosenberg, et al., U.S. Appl. No. 11/383,197, filed Aug. 31, 2006.
Rosenberg, et al., U.S. Appl. No. 11/422,065, filed Aug. 24, 2006.
Rosenberg, et al., U.S. Appl. No. 11/425,981, filed Jun. 22, 2007.
Rosenberg, et al., U.S. Appl. No. 11/425,990 filed Jun. 22, 2006.
Rosenberg, et al., U.S. Appl. No. 11/427,320, filed Jun. 28, 2006.
Rosenberg, et al., U.S. Appl. No. 11/427,325, filed Jun. 28, 2006.
Rosenberg, et al., U.S. Appl. No. 11/461,375, filed Oct. 12, 2006.
Rosenberg, et al., U.S. Appl. No. 11/431,375, filed Nov. 9, 2006.
Rosenberg, et al., U.S. Appl. No. 11/533,037, filed Sep. 19, 2006.
Rosenberg, et al., U.S. Appl. No. 11/535,417, filed Sep. 26, 2006.

Rosenberg, et al., U.S. Appl. No. 11/539,598 filed Jun. 7, 2007.
Rosenberg, et al., U.S. Appl. No. 11/555,784, filed May 24, 2007.
Rosenberg, et al., U.S. Appl. No. 11/561,981, filed Nov. 21, 2006.
Rosenberg, et al., U.S. Appl. No. 11/562,036, filed Nov. 21, 2006.
Rosenberg, et al., U.S. Appl. No. 11/563,610, filed Jun. 28, 2007.
Rosenberg, et al., U.S. Appl. No. 11/610,494, filed Dec. 13, 2006.
Rosenberg, et al., U.S. Appl. No. 11/610,499, filed Dec. 13, 2006.
Rosenberg, et al., U.S. Appl. No. 11/610,615, filed Dec. 14, 2006.
Rosenberg, et al., U.S. Appl. No. 11/618,858, filed Jun. 14, 2007.
Rosenberg, et al., U.S. Appl. No. 11/619,605, filed Jan. 3, 2007.
Rosenberg, et al., U.S. Appl. No. 11/619,607, filed Jan. 3, 2007.
Rosenberg, et al., U.S. Appl. No. 11/626,355, filed Jan. 23, 2007.
Rosenberg, et al., U.S. Appl. No. 11/676,298, filed Jul. 5, 2007.
Rosenberg, et al., U.S. Appl. No. 11677,045, filed Feb. 20, 2007.
Rosenberg, et al., U.S. Appl. No. 11/682,874, filed Mar. 6, 2007.
Rosenberg, et al., U.S. Appl. No. 11/683,394, filed Mar. 7, 2007.
Rosenberg, et al., U.S. Appl. No. 11/697,704, filed Apr. 6, 2007.
Rosenberg, et al., U.S. Appl. No. 11/697,706, filed Aug. 16, 2007.
Rosenberg, et al., U.S. Appl. No. 11/697,732, filed Apr. 8, 2007.
Rosenberg, et al., U.S. Appl. No. 11/744,879, filed Sep. 20, 2007.
Rosenberg, et al., U.S. Appl. No. 11/749,134, filed May 15, 2007.
Rosenberg, et al., U.S. Appl. No. 11/749,137, filed May 15, 2007.
Rosenberg, et al., U.S. Appl. No. 11/762,017, filed Oct. 4, 2007.
Rosenberg, et al., U.S. Appl. No. 11/772,803, filed Jul. 12, 2007.
Rosenberg, et al., U.S. Appl. No. 11/772,808, filed Jul. 2, 2007.
Rosenberg, et al., U.S. Appl. No. 11/775,314, filed Jul. 30, 2007.
Rosenberg, et al., U.S. Appl. No. 11/841,868, filed Aug. 20, 2007.
Rosenberg, et al., U.S. Appl. No. 11/846,530, filed Aug. 29, 2007.
Rosenberg, et al., U.S. Appl. No. 11/851,340, filed Sep. 6, 2007.
Rosenberg, Louis et al., "A force Feedback Programming Primer", *Immersion Corporation* 1997.
Rosenberg, Louis et al., "Virtual Fixtures: perceptual Overlays Enchance Operator Performance in Telepresence Tasks", *Ph.D. Dissertation, Stanford University* Jun. 1994.
Schotz, et al., "Automatic prediction of speaker age using CART", 2003.
Shahinpoor, Mohsen et al., "Electro-mechanics of ionoelastic beams as electrically-controllable artificial muscles", *SPIE Conference on Electroactive Polymer Actuators and Devices, SPEE* vol. 3669, 1999 1999.
Sharper Image, et al., "Laser Baseball", Item # PS115; downloaded from www.sharperimage.com on Dec. 9, 2005, 18 pages. Dec. 9, 2005, 18 pages.
Spohrer, et al., "Information in Places", *IBM Systems Journal*; 1999; pp. 602-628; vol. 38, No. 4 1999, 602-628.
Wu and Childers, et al., "Gender Recognition from Speech Part I: Coarse Analysis", 1991.
Wu and Childers, et al., "Gender Recognition from Speech Part II: Fine Analysis", 1991.
Non Final Office Action from U.S. Appl. No. 11/676,298 mailed Dec. 8, 2010.
Restriction Requirement for U.S. Appl. No. 11/744,879 mailed Nov. 10, 2010.

* cited by examiner

SOCIAL MUSICAL MEDIA RATING SYSTEM AND METHOD FOR LOCALIZED ESTABLISHMENTS

RELATED APPLICATION DATA

The present application claims benefit and priority from U.S. provisional application Ser. No. 60/920,507 entitled "Physical Musical Media Rating Paradigm for Localized Establishments," filed on Mar. 27, 2007 the disclosure of which is hereby incorporated by reference in its entirety; the present application also claims benefit and priority from U.S. provisional application Ser. No. 60/902,978 entitled "Collaborative Rejection of Media for Localized Establishments," filed on Feb. 22, 2007 the disclosure of which is hereby incorporated by reference in its entirety; this application is also a continuation-in-part of U.S. patent application Ser. No. 11/533,037, filed Sep. 19, 2006, entitled "System, Method, and Computer Program Product for Collaborative Broadcast Media," which claims priority to U.S. provisional patent application Ser. No. 60/720,071 entitled "Collaborative Broadcast Media" filed Sep. 23, 2005 the disclosure of which are hereby incorporated by reference in their entirety; this application is also continuation-in-part of U.S. patent application Ser. No. 11/676,298, filed Feb. 18, 2007, entitled "Method, System, and Computer Program Product for Intelligent Groupwise Media Selection," which claims priority to U.S. provisional patent application Ser. No. 60/897,555, entitled "Distributed Media Selection for Localized Establishments" filed Jan. 26, 2007 the disclosure of which are hereby incorporated by reference in their entirety; this application is also continuation-in-part of U.S. patent application Ser. No. 11/744,879, filed May 6, 2007, entitled "Collaborative Rejection of Media for Physical Establishments" the disclosure of which is hereby incorporated by reference in its entirety."

FIELD OF THE APPLICATION

The present invention relates generally to a musical media rating system and method for localized establishments.

BACKGROUND

In recent years wireless phones and other similar portable wireless communication devices have become a nearly universally carried by people around much of the world. Presently wireless portable communication devices enable more than just person-to-person voice communication, enabling wireless data transmission as well. Wireless data transmission is enabled in a variety of ways including text messaging over phone networks, Bluetooth communication connections over ad hock networks, Wi-Fi communication, and other wireless communication connections.

Despite the fact that most people in the industrialized world today who visit physical establishments such as restaurants, bars, gyms, and clubs, enter those establishments equipped with at least one portable wireless communication device upon their person, few technologies currently exist that enable the patrons of such physical establishments to selectively influence the environment of that establishment by entering data into their portable computing device. In a prior invention by present inventor, as disclosed in co-pending provisional patent application Ser. No. 60/897,555 entitled "Distributed media selection for localized establishments," the disclosure of which is hereby incorporated by reference, patrons of a physical establishment such as a restaurant, bar, coffeehouse, retail store, theater, stadium, or mall, may select the music for public play within that establishment by entering music selection data into a cell phone or other portable computing device on their person and sending an electronic message to a remote server.

What is needed, however, is a method by which other patrons of that same localized physical establishment may rate the music selection made by a selecting patron. What is also needed is a method by which a statistical result may be derived from a plurality of ratings received from a plurality of the other patrons. A method by which the selecting patron and/or the plurality of other patrons may be informed of the statistical result, thereby being informed as to the collective response to the selected media is further needed. Embodiments of the present invention address these needs.

SUMMARY

In a continuation-in-part parent application, a system, method, and computer program product is disclosed which enables the patrons of a localized physical establishment to select specific musical media files to be played within that establishment by entering data into a wireless portable computing device on their person. Upon entering a media file selection into a portable computing device, a message is sent over a wireless link to an establishment media server that maintains a playlist for the establishment. The message may be, for example a Short Message Service ("SMS") text message from the portable computing device that encodes the selected song and target establishment. In this way the establishment media server receives an indication of a particular media selection as well as a particular localized physical establishment to which that media selection is associated. The establishment media server then adds the particular media selection to a playlist associated with that particular localized physical establishment, thereby coordinating the public play of media with that establishment. In this way a plurality of separate users may selectively use a portable computing device upon each of their persons to add specific musical media file selections to a playlist for a particular localized physical establishment. The playlist is then used to sequentially play musical media files through speakers within the establishment such that the patrons of that establishment can listen to the music selected by the plurality of separate patrons. In a common embodiment the portable computing device used by each patron is a cell phone.

Embodiments of the present invention provide an extension of this previous system that is configured to enable a plurality of other patrons with a localized physical establishment to provide subjective rating data as to their partiality towards a musical media file that has been selected for play by another patron. In this way, one patron may select a piece of musical media for play within a localized physical establishment and a plurality of other patrons, upon hearing the selected piece of musical media play, may enter subjective rating data into their own portable computing devices, a representation of their subjective rating data being communicated as an electronic message to the establishment media server. The establishment media server may thereby receive subjective rating data from each of a plurality of other patrons, the subjective rating data relating to a currently playing media file within a particular physical establishment. In some embodiments the subjective ratings provided by each patron may be a binary rating value that indicates if the patron's partiality towards the currently playing media file is either favorable or unfavorable. In some embodiments the subjective ratings provided by the other patrons are analog rating values that indicate the patrons partiality on a rating scale, for example from 1 to 10, that represents a range of subjective ratings towards the musical piece from unfavorable to favorable. The establishment media server receives such a plurality of subjective rating data messages from each of a plurality of other patrons, and computes a statistical result, the statistical result reflecting the partiality of the group of other patrons towards the currently playing media file. For example, the statistical result may reflect the average, mean, or median subjective rating across the group of other patrons who provided subjective rating data. Alternately, the statistical result may reflect the percentage of other patrons who rated the musical piece favorably and/or the percentage of other patrons who rated the musical piece unfavorably.

After a statistical result is computed by the establishment media server, a representation of the statistical result is sent as an electronic message to the patron who suggested the musical media piece for play and/or to each of the other patrons who provided subjective rating data about their partiality towards the playing musical media piece. A representation of the statistical result is then displayed to the patron who suggested the musical media piece for play and/or to each of the other patrons who provided subjective rating data about their partiality towards the playing musical media piece on their personal portable computing devices. In this way the patrons who receive the representation of the statistical result are informed as to the collective partiality towards the playing musical media piece among a group of patrons of the establishment.

For example, a first patron may select a first song for play within a first establishment by sending an SMS text message to the establishment media server, where the SMS message encodes an indication of the desired song by unique media ID value and an indication of the desired establishment by unique establishment ID. A plurality of second patrons may provide subjective rating data about the first song while it plays within the first establishment by each sending an SMS text message to the establishment media server while the first song plays within the establishment. The SMS text message may include an indication as to which establishment the rating value relates to, by unique establishment ID, as well as an indication of the rating value. For example, the text message may include a coded value "R07," which means the user rates the song a 7 on a scale of 1 to 10, with 1 being the lowest partiality towards the song and 10 being the highest partiality towards the song. Alternatively, the text message may include a coded value of "TU" or "TD," which stand for "Thumbs Up" or "Thumbs Down," respectively, indicating a binary indication of partiality towards the currently playing song within the designated establishment. The establishment media server thus receives a plurality of subjective rating data segments from each of a plurality of other users while the first song is playing and computes a statistical result. The statistical result may be, for example, a computation that 75% of the other patrons rated the song favorably and 25% of the other patrons rated the song unfavorably. Alternately, the statistical result may be, for example, a computation that the mean subjective rating value across the other patrons was a rating of 7.8 on scale of 1 to 10, with 1 being the least favorable rating and 10 being the most favorable rating. Finally, the establishment media server sends a representation of the statistical result to the first patron and/or to a plurality of the other patrons, each of their portable computing devices displaying a representation of the statistical result. In this way the first patron and/or a plurality of the other patrons are informed as to the statistical distribution of partiality towards the selected song among the plurality of other patrons who provided subjective rating data. This is fun and interesting to patrons, for example enabling a first patron to select a song for public play within an establishment, and then enabling that first patron to be displayed feedback as to the favorability and/or unfavorability of his or her selection to a plurality of other patrons within the establishment. This feedback is highly interesting and entertaining to both the first patron who made the selection and the plurality of other patrons who provided the subjective rating data feedback.

In addition, a patron who selects a song may be provided with data from the establishment media server that indicates how the collective partiality towards the selected song compares with the collective partiality towards other songs that have been selected in the past within the particular establishment. For example, the establishment media server may determine a ranking of the selected song with respect to collective partiality as compared to other songs. In this way the first patron, and/or the plurality of other patrons, may be informed through an electronic message from the establishment media server, how the song in question was rated as compared to how other songs were rated within the establishment. The data might indicate, for example, that the selected song was the 7th most favorably rated song of the 65 songs thus far selected by patrons within the establishment during a particular time period, for example the current day. Such a ranking may be presented as a value 7/65, indicating that it was the 7th most favorably rated song of the 65 songs thus far rated by patrons on that day within that establishment.

Finally, the process described above which enables a patrons to provide subjective rating data as to their partiality towards a currently playing song within a localized physical establishment may be used by establishment media server to compile personal profile data for each of the plurality of other patrons. More specifically, the data provided by patrons indicating their partiality towards a currently playing media file may be used to compile personal media taste data for each of a plurality of individual users, the personal taste data indicating their partiality towards each of a plurality of musical songs, musical artists, musical albums, and/or musical genres. Examples of how such subjective rating data may be collected stored in memory and used to represent a user's partiality towards a piece of musical media is disclosed in co-pending patent applications by the current inventor, Ser. Nos. 11/223,386 and 11/267,079, the disclosures of which are both incorporated herein by reference.

In some embodiments the statistical result associated with a particular musical media file is computed by the establishment media server, transmitted to at least one personal portable computing device, and output to the user of that personal portable computing device during the play of that particular musical media file. In some embodiments, it is the statistical result associated with a particular musical media file is computed by the establishment media server, transmitted to at least one personal portable computing device, and output to the user of that personal portable computing device multiple times during the play of that particular musical media file. In some embodiments the statistical result associated with a particular musical media file is computed by the establishment media server, transmitted to one or more personal portable computing devices, and output to the user of that personal portable computing device after the completion of play of that particular musical media file.

The above summary of the present invention is not intended to represent each embodiment or every aspect of the present invention. The detailed description and Figures will describe many of the embodiments and aspects of the present invention.

BRIEF DESCRIPTION OF THE DRAWINGS

The above and other aspects, features and advantages of the present embodiments will be more apparent from the following more particular description thereof, presented in conjunction with the following drawings wherein.

Figure 1:
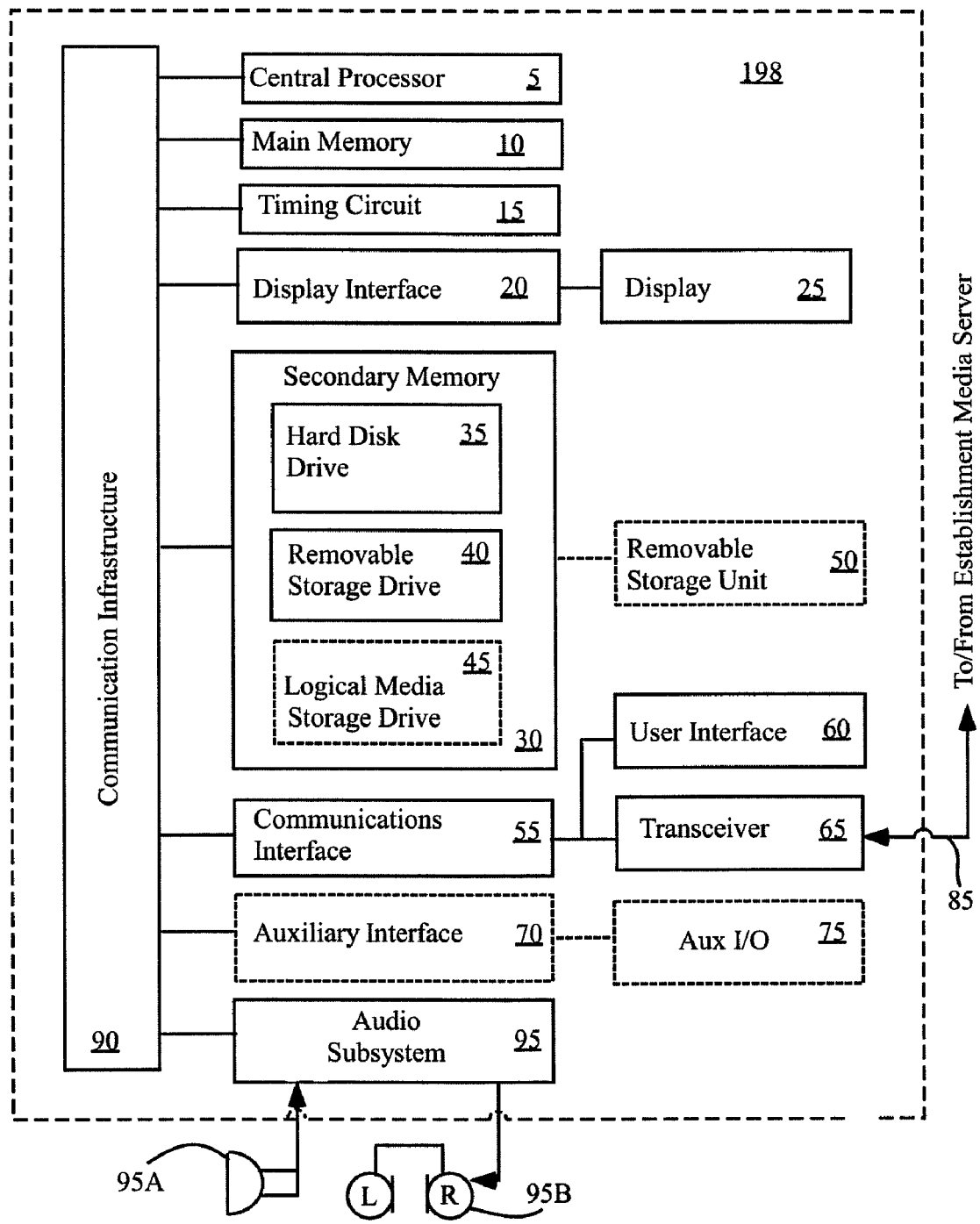
FIG. 1 illustrates a generalized block diagram of an establishment media player according to an embodiment of the invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Embodiments of the present application are directed toward a system, method, and computer program product is provided which enables the patrons of a localized physical establishment to individually rate a piece of musical media that is playing publicly within the establishment. More specially, a server based system is provided that enables the patrons of an establishment to rate a piece of musical media that is currently playing within an localized physical establishment by sending an electronic message from a cell phone or other personal portable wireless communication device. The system is also operative to compute a statistical result of a plurality of ratings received from a plurality of individual users, each rating being sent from a cell phone or other personal portable wireless communication device of an individual user. The system is further operative to send the statistical result to the cell phone or other personal portable wireless communication device of a user who suggested the song and/or of each user who provided a rating. The system is also operative to cause the early termination of the playing of a currently playing musical media piece in response to the statistical result being lower than a threshold value. The system is further operative to ensure that each individual user who provides a rating, may only rate a currently playing media file once during its play. The system is also operative to award score points and/or other reward units to the user who suggested a song based at least in part upon the statistical result being higher than a threshold value. The system is further operative to maintain a user profile for each of a plurality of individual users, the user profile of an individual user being updated in response each of a plurality of rating value provided by that user, the profile being updated to reflect that user's partiality towards the particular musical piece, musical genre of the musical piece, album of the musical piece, and/or artist of the musical piece.

Embodiments of the present invention relates generally to a collaborative media selection system for localized wherein a plurality of users may collaboratively rate a currently playing media file within a local physical establishment. More specifically, embodiments of the present invention relate to a collaborative method by which a plurality of users of individual portable computing devices may wirelessly express a subjective rating of their partiality towards a currently playing media file in a physical establishment and have a statistical compilation of the rating results be displayed to the user who selected the media item and/or to each of the users who provided subjective ratings.

As discussed in patent application, US 2004/0224638 A1, Ser. No. 10/423,490 to Fadell, et al., and assigned to Apple Computer, Inc., the disclosure of which is herein incorporated by reference in its entirety, an increasing number of consumer products are incorporating circuitry to play musical media files and other electronic media. Such technologies are generally referred to as media players and enable large numbers of musical media files to be stored in an electronic memory and selectively accessed for play through an audio output. Physical establishments often employ media playing devices to play musical media to the patrons of those establishments through speakers mounted in the walls and/or ceiling of the establishment. In some embodiments a digital playlist or other digital sequencing of musical media files may define the sequence of musical media content (e.g., songs) that are played to the patrons of a physical establishment through the speakers of that establishment. In some embodiments the musical media is stored locally within an electronic memory on the premises of the establishment and are selectively accessed for play to the patrons of that establishment using a preplanned playlist, an automated selection process, and/or a combination of the aforementioned. Thus, hardware and software infrastructure exists that enables musical media to be played to patrons of an establishment based upon preplanned sequencing of musical media files and/or based upon an automated selection, for example randomized selection, of musical media files.

In some simple embodiments a third party, for example a representative of an establishment may select songs for play within that establishment by manually defining a playlist of media files for play within that establishment. In a more advanced embodiment an automated process may be used for automatically selecting media files from a plurality of available media files for play within the establishment. In a particularly advanced embodiment, as disclosed by the current inventor in co-pending patent application Ser. No. 11/676,298, filed Feb. 18, 2007, entitled "Method, System, and Computer Program Product for Intelligent Groupwise Media Selection," the disclosure of which is hereby incorporated by reference, the automatic selection of media for an establishment may be performed using an intelligent media selection process that considers the stored media tastes and/or the stored media exposure history of a plurality of current patrons of an establishment. In another embodiment disclosed by the current inventor in co-pending provisional patent application Ser. No. 60/897,555, entitled "Distributed Media Selection for Localized Establishments," the disclosure of which is hereby incorporated by reference in its entirety, media files may be selected by patrons of an establishment by sending electronic messages to an Establishment Media Server that indicate a desired media file to be played within a particular establishment. Thus, a variety of methods exist for selecting media files for play within an establishment including selecting media files off a preplanned playlist, selecting media files at random from a plurality of available media files, selecting media files using an intelligent algorithm from a plurality of available media files, and/or enabling patrons to manually select media files for play within an establishment by sending electronic messages that indicate a desired media file for play. In some such embodiments the media selection process is performed locally within a physical establishment by routines running upon the media player hardware itself. In other embodiments the media selection process is performed upon a remote server and is sent electronically over a communication medium to a media player for play within a physical establishment.

Therefore, varieties of methods exist for selecting and playing media (for example, musical songs) to patrons within a localized physical establishment such as a restaurant, bar, coffeehouse, or retail store. Regardless of the how a currently playing media file was selected, the present invention provides for advanced methods, apparatus, and computer program products by which other patrons of the establishment, upon hearing the playing song, may provide subjective rating data as to their partiality towards the musical media piece. More specifically, certain embodiments of the present invention provides for methods, apparatus, and computer program products by which the patrons of an establishment may each individually provide subjective rating data as to their partiality towards a currently playing media file to the establishment media server, the establishment media server being configured to generate a statistical result as to the partiality of the group of responding patrons towards the currently playing media file within the given establishment. In this way a group of patrons of an establishment may collaboratively produce a collective subjective rating for a piece of playing media based upon each of their individual inputs. This collective subjective rating is embodied as a statistical result generated by the establishment media server. A representation of the statistical result may be sent by the establishment media server, as an electronic message, to the patron who selected the musical media file for play and/or to the other patrons who provided subjective rating data as to their partiality to the playing media file. In this way the patron who selected a piece of musical media for public play within an establishment is provided with feedback from a plurality of other patrons of that establishment as to their collective subjective partiality towards the media file. In addition, the patrons who provided subjective rating data may also be provided with feedback as to the collective subjective partiality towards the media file. This provides for a fun and interesting social experience wherein the patrons of an establishment may get information as to the feelings of a group of other patrons towards currently playing musical media files.

As used herein the phrase "statistical result" refers to a mathematical representation of a plurality of individual subjective ratings provided by a plurality separate patrons of an establishment towards media file that plays within the establishment. A variety of statistical methods may be used to represent the central tendency of partiality of the group of responding patrons towards the musical media piece. For example, the statistical result may be a mean, median, or average subjective rating across a plurality of patrons. Also for example, the statistical result may also be a percentage of patrons who rated the musical media piece favorably and/or a percentage of patrons who rated the musical media piece unfavorably.

Embodiments of the present invention enable the patrons of a localized physical establishment to selectively rate a media file currently playing upon a public media player of the establishment by sending an electronic rating message to a moderating processor from a wireless portable computing device on their person. In a common embodiment each portable computing device is a wireless phone that is configured to send and receive data to a remote server over a communication network, the remote server being an establishment media server of the present invention. In a common embodiment the electronic messages are SMS text messages sent by patrons from their wireless phone. In some such embodiment the electronic rating message encodes the establishment for which the rating applies (i.e., the rating applies to the currently playing song in the identified establishment) and the rating value. For example, the SMS text message may include an encoded establishment ID and an encoded rating value. The SMS text message may be a string such as "012844 R8" which means that the patron who sent the text message was rating the song that was currently playing in the establishment with ID value 012844, the rating value being an 8 on a scale of 1 to 10. Alternate string configurations may be used to encode the establishment and rating value.

In these ways, embodiments of the present invention enable the patrons of a localized physical establishment such as a restaurant, bar, gym, coffee house, retail store, supermarket, bus stop, or health club, to use their wireless communication device (e.g., their phone) to selectively provide subjective rating data as to their partiality towards a media file currently playing within the localized physical establishment. In an embodiment, patrons send an SMS text message, instant message, or other real-time electronic message to the establishment media server indicating their subjective rating value. The electronic message may include a unique ID value for the establishment for which the currently playing media file is to be rated. The electronic message may also include an encoded rating value that may be binary or analog. In this way the establishment media server may collect rating values from a plurality of patrons of a localized physical establishment and generate a statistical result. A representation of the statistical result may then be sent as an electronic message from the establishment media server to the patron who selected the musical media file that was rated and/or to the other patrons who provided rating data for the musical media file. The statistical result is then displayed to the patrons. In this way the patrons of an establishment may be informed as to the collective partiality of a group of patrons with the establishment towards a currently playing, or just completed play, musical media file.

In some embodiments the unique ID code for the particular establishment (or particular media player associated with the particular establishment) is encoded as unique numeric value bracketed between two pound symbols, for example #162342#. In an alternate embodiment the unique ID code for the particular establishment is a value that begins and ends with the same digit, for example 1345431. An advantage of such configurations is that an SMS message or other electronic message sent to the establishment media server may be easily parsed by routines of the server such that any numeric value that is received between two pound signs is interpreted to be the unique ID code of a particular establishment (or associated media player) to which the request applies. A variety of other symbols could be used for identifying the numeric code of a particular establishment.

Embodiments of the present invention also provide a method and apparatus by which patrons can be easily billed for rating a currently playing musical media file within a particular localized physical establishment. In some such embodiments the patron is billed based upon the phone number from which the electronic rating message was sent, the fee for rating being billed to the phone bill of that phone number. In some embodiments a user is billed for each electronic rating message that he or she sends to the establishment media server. In other embodiments a user is only billed for electronic rating messages that he or she sends to the establishment media server that result in the termination of a currently playing media file.

Embodiments of the present invention also provide for a password protection method helping to ensure that only substantially current patrons of a localized physical establishment may provide electronic ratings for musical selections for that establishment. Where necessary, computer programs, algorithms and routines are provided, programmed in a high level language computing language, for example Java™ C++, C#, or Visual™ Basic™.

Embodiments of the present invention generally operate by using a unique establishment ID for each enabled establishment, the unique establishment ID indicating a particular localized physical establishment such as a restaurant, bar, club, theater, store, localized area of a mall, stadium, or gym, within the real physical world. Embodiments of the present invention further operate by maintaining establishment-specific playlists, where each establishment specific playlist is a sequenced listing of particular media items (indexed, for example by a unique media ID value for each) that is scheduled or otherwise ordered for play within a particular localized physical establishment. An establishment specific playlist is generally relationally associated with a particular unique establishment such as a particular restaurant, bar, cub, or gym within the real physical world. Embodiments of the present invention also generally operate by using a unique user ID for each user of a portable computing device of the present invention, the unique user ID identifying the specific user (or the specific portable computing device of the user), such that the unique user may be uniquely billed for making selections that are added to an establishment-specific playlist of a particular unique establishment.

Embodiments of the present invention also generally operate by having a unique code, string, or protocol for communicating a rating value to the establishment media server. For example, embodiments that use SMS text messaging may be configured to encode a rating value as an "R" followed by a number. In some such embodiments the number may be between 1 and 10 on a subjective rating scale. In some such embodiments 1 represents the lowest level of partiality towards a musical media piece and 10 represents the highest level of partiality towards a musical media piece, and the values in between represent the scale of partiality between those two limits. In some such embodiments a 1 represents strong dissatisfaction with a musical media piece, a 10 represents strong satisfaction with a musical media piece and 5.5 represents a neutral partiality towards the musical media piece. In some embodiments the scale used may be between 0 and 10, with 5 being the neutral partiality value. In some embodiments the 0 value may be assigned an extra meaning, not only a rating that indicates the lowest level of partiality but also an indication that the user would like to request that the playing piece of media be terminated prior to full completion. Such a termination request may thus be sent as part of a subjective rating indication. A complete disclosure that describes the use of termination requests is provided by a co-pending patent by the present inventor with application Ser. No. 11/744,879, which claims priority to U.S. provisional patent application Ser. No. 60/902,978, the disclosures of which are hereby incorporated by reference in their entirety.

Thus, in one example embodiment, a user of an embodiment of the present invention may send a text message to the establishment media server, with the message indicating an establishment ID and a subjective rating value. The establishment ID may be a number encoded as a "#" sign followed by a six digital numeral. The subjective rating value may be encoded as an "R" followed by a numeral between 0 and 10. In this way an SMS text message sent from a portable computing device of a user to the establishment media server that included the string "#102345 R9" is parsed by the establishment media server to mean that the user who sent the text message would like to rate the song that is then currently playing within establishment 102345 with a value of 9 on a defined subjective rating scale, for example on the scale of 0 to 10. This would indicate that the user, who is identified by the establishment media server based upon a unique addressing ID of his or her portable computing device, rates the song currently playing in the establishment with ID value 102345, with the very positive value of 9 on the scale of 0 to 10. The establishment media server may also record that a rating was received from the particular users in a temporary data store as a means of ensuring that a single user, as identified by the unique user ID or portable computing device address, can only provide a single rating value for a particular instance of a particular song playing within a particular establishment. In some embodiments the user may also be charged a nominal messaging fee for providing the subjective rating, for example $0.05 cents for providing the rating. In some such embodiments a user may purchase credits such as, for example, 20 credits for a dollar, and is decremented one credit in exchange for providing rating data for a particular song. In other embodiments users pay a monthly subscription fee for the service and may provide unlimited rating data as paying customers of the service.

A large physical establishment, such as a hotel, may employ a plurality of unique venues for music play, with each serviced by a separate media player playing separate media files to patrons. In such situations a single physical establishment may be treated as multiple separate establishments by the routines of embodiments of the present invention, each serviced by a separate media player and each assigned a separate establishment ID value.

Embodiments of the present invention generally employ a centralized architecture that includes an establishment media server, the establishment media server maintaining establishment-specific playlists for one or more unique establishments within the real physical world. In a preferred embodiment the establishment media server is operated by a service provider and is configured to maintain establishment-specific playlists for a large plurality of unique establishments, each establishment-specific playlist being relationally associated with the establishment ID of that unique establishment. Embodiments of the present invention also generally operate by enabling a plurality of portable computing devices, each used by a separate user, to independently communicate with the establishment media server and make media selections that are added to a particular establishment playlist. Such a media selection process is disclosed in detail in co-pending provisional application Ser. No. 60/897,555 by the present inventor, the disclosure of which has been incorporated herein by reference. This enables plurality of users who are visiting a particular establishment to each make additions to the playlist for that establishment, each user employing their own portable computing device. The establishment media server is generally in communication with an establishment media player for each particular establishment for which it maintains an establishment specific playlist. In this way the establishment media server may send information to the establishment media player of a particular establishment, thereby causing the establishment media player of that establishment to play media in accordance with an establishment-specific playlist that is associated with that establishment. Embodiments of the present invention further enable a plurality of portable computing devices, each used by a separate user, to independently communicate with the establishment media server and convey electronic rating messages with respect to a currently playing media file for that establishment, or in some embodiments with respect to a proposed media file for future play within the establishment.

FIG. 1 illustrates a generalized block diagram of an establishment media player 198 according to an embodiment of the invention. The establishment media player 198 includes a communications infrastructure 90 used to transfer data, memory addresses where data files are to be found and control signals among the various components and subsystems associated with the establishment media player 198. A central processor 5 is provided to interpret and execute logical instructions stored in the main memory 10. The main memory 10 is the primary general purpose storage area for instructions and data to be processed by the central processor 5. The term "main memory" 10 is used in its broadest sense and includes RAM, EEPROM and ROM.

A timing circuit 15 is provided to coordinate activities within the media player in near real time. The central processor 5, main memory 10 and timing circuit 15 are directly coupled to the communications infrastructure 90.

A display interface 20 may be provided to drive a display 25 associated with the establishment media player 198. The display interface 20 is electrically coupled to the communications infrastructure 90 and provides signals to the display 25 for visually outputting both graphical displays and alphanumeric characters.

The display interface 20 may include a dedicated graphics processor and memory to support the displaying of graphics intensive media. The display 25 may be of any type (e.g., cathode ray tube, gas plasma) but in most circumstances will usually be a solid-state device such as liquid crystal display.

A secondary memory subsystem 30 is provided which houses retrievable storage units such as a hard disk drive 35, a removable storage drive 40, an optional logical media storage drive 45 and an optional removal storage unit 50. One skilled in the art will appreciate that the hard drive 35 may be replaced with flash memory.

The removable storage drive 40 may be a replaceable hard drive, optical media storage drive or a solid state flash RAM device. The logical media storage drive 45 may include a flash RAM device, an EEPROM encoded with playable media, or optical storage media (e.g., a CD or DVD). The removable storage unit 50 may be logical, optical or of an electromechanical (hard disk) design. A communications interface 55 subsystem is provided which allows for standardized electrical connection of peripheral devices to the communications infrastructure 90 including, serial, parallel, USB, and Firewire™ connectivity. For example, a user interface 60 and a transceiver 65 are electrically coupled to the communications infrastructure 90 via the communications interface 55. For purposes of the descriptions herein, the term "user interface" 60 includes the hardware and operating software by which a user interacts with the establishment media player 198 and the means by which the media player conveys information to the user and may include the display interface 20 and display 25.

Because the establishment media player 198 is a player that is providing music to localized physical establishment such as a restaurant, the user interface 60 is generally configured for employees of that restaurant, for example enabling the employees to adjust the volume of the media player as it outputs media across the restaurant.

The transceiver 65 facilitates the remote exchange of data and synchronizing signals between the establishment media player 198 and other devices in processing communications 85 with the establishment media player 198. As disclosed herein, the other devices include an establishment media server 199 that maintains an establishment specific playlist for the establishment. The establishment media server may be configured as part of the same hardware as the establishment media player, but in most preferred embodiments is a remote server that is maintained by a service provider and is located off the grounds of the localized physical establishment. In some embodiments establishment media player 198 communicates with the establishment media server 199 over a communication network such as the Internet. The communication link may be wired, wireless, or a combination of wired or wireless.

The transceiver 65 may also facilitate the remote exchange of data between the establishment media player and plurality of portable computing devices 100 on the persons of individuals, each of the personal information devices being associated with a user and generally containing personal data about that user. In some embodiments the transceiver 65 is a radio frequency type normally associated with computer networks for example, wireless computer networks based on BlueTooth™ or the various IEEE standards 802.11x, where x denotes the various present and evolving wireless computing standards, for example WiMax 802.16 and WRANG 802.22. Alternately, digital cellular communications formats compatible with for example GSM, 3G, CDMA, TDMA and evolving cellular communications standards. Both peer-to-peer ("PPP") and client-server models are envisioned for implementation of the invention. In a third alternative embodiment, the transceiver 65 may include hybrids of computer communications standards, cellular standards and evolving satellite radio standards, as well as landlines.

The user interface 60 employed on the establishment media play 198 may include a pointing device (not shown) such as a mouse, thumbwheel or track ball, an optional touch screen (not shown); one or more push-button switches 60A, 60B; one or more sliding or circular rheostat controls (not shown) and one or more other type switches (not shown). The user interface 60 provides interrupt signals to the processor 5 that may be used to interpret user interactions with the establishment media player 198 and may be used in conjunction with the display interface 20 and display 25. One skilled in the art will appreciate that the user interface devices, which are not shown, are well known and understood. In this way employees of the establishment may interact directly with the establishment media player and input configuration information.

Last, an audio subsystem 95 is provided and electrically coupled to the communications infrastructure 90. The audio subsystem provides for the output of digital media, for example, multi or multimedia encoded in any of the exemplary formats such as MP3, AVI, WAV, MPG, QT, WMA, AIFF, AU, RAM, RA, MOV, and MIDI. The audio subsystem may include a microphone input port 95A for input of voice commands. The audio subsystem also includes an audio output port 95B, which may output musical media to speakers, headphones, or other sound producing devices. In most preferred embodiments the audio output port 95b is connected to a plurality of speakers located around the localized physical establishment, for example mounted within or upon the ceiling and/or walls of the establishment. Connection of the microphone 95A and/or speakers 95B includes both traditional cable and wireless arrangements such as BlueTooth™ are known in the relevant art.

In addition, the audio subsystem may optionally include features such as graphic equalization, volume, balance, fading, base and treble controls, surround sound emulation, and noise reduction. One skilled in the art will appreciate that the above-cited list of file formats is not intended to be all-inclusive.

The establishment media player 198 includes an operating system, the necessary hardware and software drivers necessary to fully utilize the devices coupled to the communications infrastructure 90, media playback and recording applications, data access routines for sending and/or receiving data from the establishment media server 199 and/or from portable computing devices 100. To support certain embodiments of the present invention, the establishment media player 198 may also be configured to terminate the play of currently playing media file in response to electronic rating values being received by the establishment media server 199 from a plurality of patrons such that the central tendency of the rating values is lower than a particular level or threshold. In this way the establishment media server may receive electronic rating messages from a plurality of patrons over a wireless communication link such as, for example, SMS messaging, may compute a statistical result of the received electronic rating messages, may determine based upon the level of the statistical result if a currently playing media file is to be terminated within a particular establishment, and then may send a signal and/or message to the establishment media player 198 of the particular establishment, causing that media player to cease playing a currently playing media file and begin playing a next media file. In some such embodiments the establishment media server 199 may also take actions to credit back at least a portion of the fee that was charged to the user who originally requested that media file. The establishment media server 199 may also take actions to charge a fee to the users who sent electronic rating messages relating to the media file that was terminated. Finally, the establishment media server 199 may send an SMS message to the user who requested the media file, informing that user as to the nature and/or content of the statistical result.

Figure 2:
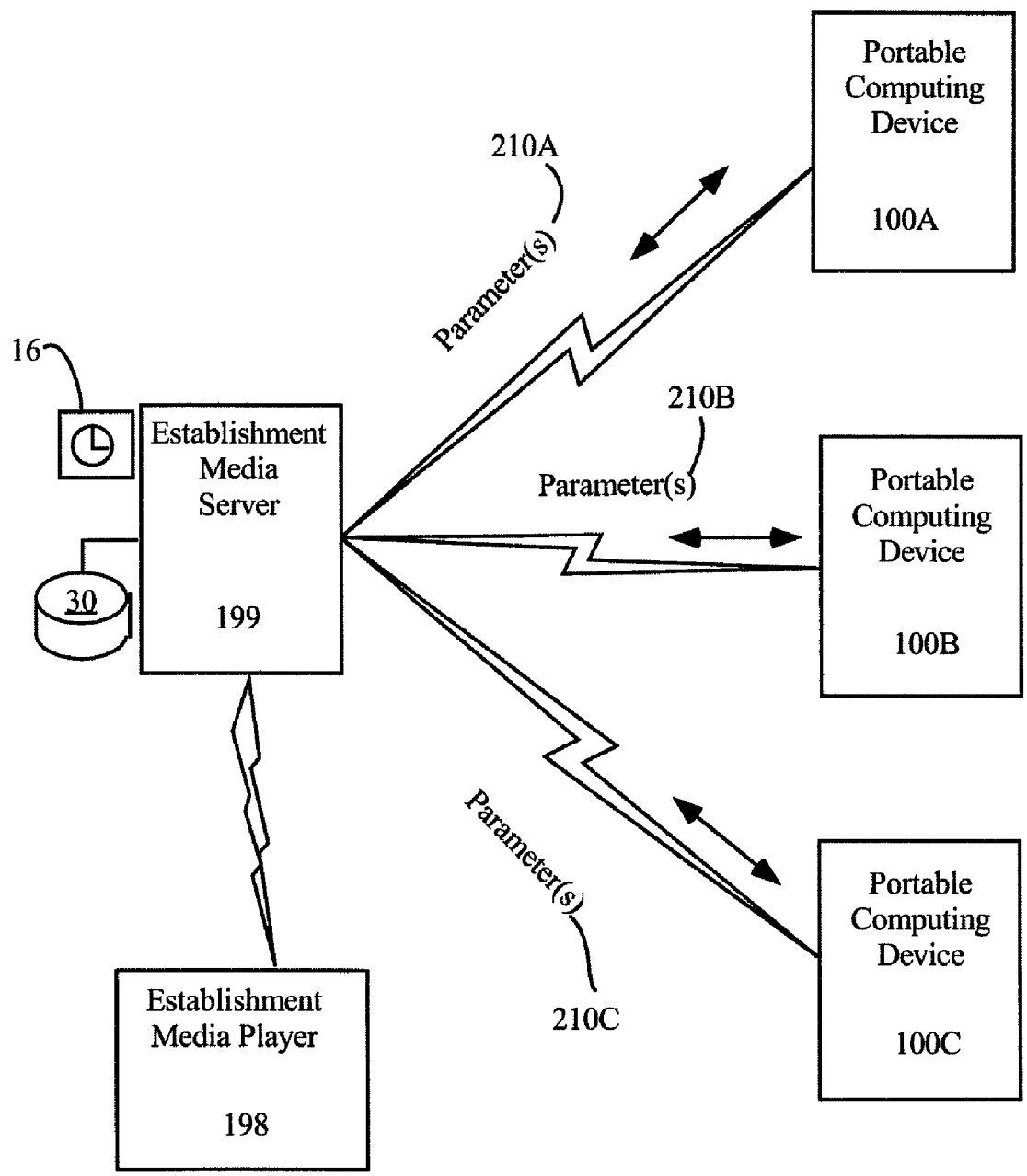
FIG. 2 illustrates a generalized block diagram including the establishment media player, the establishment media server, and a plurality of wireless portable computing devices, which may be for example wireless phones of the persons of patrons of an establishment according to an embodiment of the invention.

FIG. 2 illustrates a generalized block diagram including the establishment media player 198, the establishment media server 199, and a plurality of wireless portable computing devices 100A, 100B, and 100C, which may be for example wireless phones of the persons of patrons of an establishment according to an embodiment of the invention. In general there may be a plurality of establishment media players 198 in each of a plurality of unique localized physical establishments, each in communication with a single establishment media server 199, although only a single establishment media player 198 is shown in FIG. 2. Thus, FIG. 2 is meant to represent the system as it relates to a single localized physical establishment, including the establishment media player 198 for that particular establishment and a plurality of portable computing devices 100A, 100B, and 100C for a plurality of current patrons of that localized physical establishment. The establishment media player and/or establishment it is located within is generally assigned a unique ID such that the establishment media server 199 can uniquely identify and address it from among a plurality.

FIG. 2 also shows that each portable computing device 100 is configured to exchange data with the establishment media server 199. This data may include media selections made by a user of a portable computing device for a particular establishment, the media selections being received by the establishment media server and being added to the unique playlist for that particular establishment. The data may also include a media menu of available media files for a particular establishment, the media menu being sent from the establishment media server 199 to the portable computing devices 100 that are within that particular establishment (or have otherwise been identified as being associated with that particular establishment). The data may also include part or all of a current establishment-specific playlist of a particular establishment being sent from the establishment media server 199 to the portable computing devices 100 that are within that particular establishment (or have otherwise been identified as being associated with that particular establishment). The data may also include electronic rating message sent from a portable computing device 100, to the establishment media server 199. The data may also include a representation of the statistical result of a plurality of subjective rating data values, the representation of the statistical result being sent from the establishment media server 199, to one or more portable computing devices 100. In addition, although not shown, the portable computing devices 100 and the establishment media player 198, may exchange data directly.

The establishment media player 198 of a particular establishment is in communication with the establishment media server 199 and exchanges data there between. In this way, the establishment media server may send playlist information and/or may send media content consistent with a stored playlist to the establishment media player 198. This is how the establishment media server may be operative to orchestrate the media content that is played by the establishment media player 198 such that it is consistent with a stored establishment-specific playlist. This is also how the establishment media server 199 can keep track of what song is currently playing within an establishment via media player 198. Such keeping track is valuable for it enables the establishment media server 199 to receive an electronic rating message that is associated with a particular establishment and thereby determine which media file the rating refers to based upon what media file is known to be currently playing within the designated establishment.

In some embodiments the actual media content of media files may be stored upon the establishment media server 199 and streamed to the establishment media player 198, although this approach is bandwidth intensive, especially if the establishment media server is in communication with a large plurality of establishment media players. Instead the actual media content of media files may be stored locally to the establishment media player 198 and is accessed by the establishment media player 198 in accordance with the requirements of the establishment specific playlist for that establishment as it is maintained by the establishment media server 199. In such embodiments the establishment media server may simply send unique media ID values to the establishment media player 198 indicating by unique ID which media items are to be played at what times (or in what order) to be consistent with the establishment specific playlist for that establishment. In other embodiments the whole playlist is communicated to the player 198. In addition the establishment media server 199 may send coded message to the establishment media player 198 indicating if and when a currently playing media file is to be terminated prior to its normal completion of play as a result of subjective rating data being received with a central statistical tendency that is below a certain value or threshold.

Figure 3:
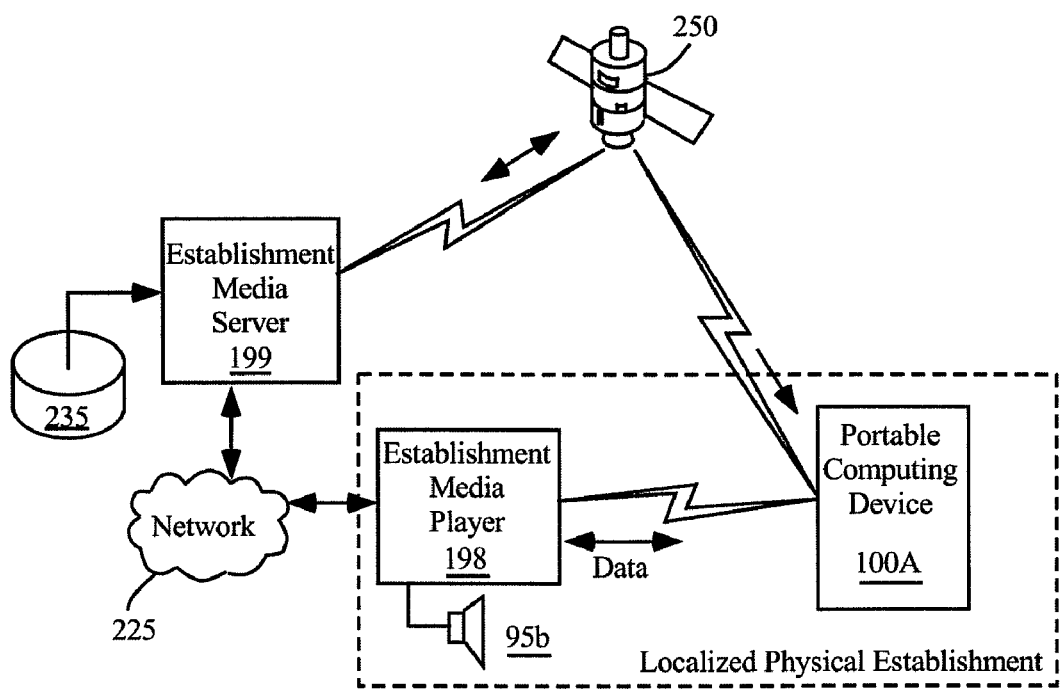
FIG. 3 illustrates a block diagram indicating the boundaries of a localized physical establishment (as shown by the dotted line) according to an embodiment of the invention.

FIG. 3 illustrates a block diagram indicating the boundaries of a localized physical establishment (as shown by the dotted line) according to an embodiment of the invention. Inside the boundaries is an establishment media player 198 that is connected to a speaker 95*a* that are located around the localized physical establishment. The establishment media player 198 communicates over a network such as, for example, the Internet, with the establishment media server 199. In addition a plurality of portable computing devices 100A are located within the establishment and receives the unique ID for that establishment either by visual display to the user (through a sign) or through electronic communication, for example by an electronic signal from the media player or other electronics associated with the unique localized physical establishment. For example, the user may manually enter the unique establishment ID into the portable computing device using a keypad. Alternately the portable computing device may receive the unique ID for the establishment when within proximity of the establishment by an electronic communication means such as a Bluetooth link, WiFi link, or RFID communication link. Once the portable computing device has the unique ID of the establishment it may communicate that unique ID, along with any media selection requests and/or media rating messages, to the media server 199. As shown FIG. 3, the communication between the portable computing device 100A and the establishment media server 199 may be over wireless link, for example, through an intervening satellite 250.

Thus, through the interactions of the establishment media server 199, the establishment media player 198, and a plurality of portable computing devices 100, a system, method, and computer program product is provided which enables the patrons of a localized physical establishment to select specific musical media files to be played within that establishment by entering data into a wireless portable computing device on their person. In addition, patrons may provide rating feedback with respect to a currently playing media selection In certain embodiments an establishment specific password or other authentication key must be provided by the portable computing device 100 of a patron for the patron to add a musical media file to the playlist for that establishment at a particular time and/or for the patron to send a valid electronic rating message relating to a currently playing media file within that establishment. By regularly updating the password and only providing the password to current patrons of an establishment, either electronically or physically, the present invention may be configured to only enable substantially current patrons of a physical establishment to select and/or rate musical media files for that particular establishment. For example, a regularly updated password may be electronically sent to portable computing devices of the current patrons of a particular establishment to enable those portable computing devices to send valid messages to the establishment media server that enable media items to be added to the playlist for that particular establishment. In some embodiments the password need only be updated daily. In such embodiments the password may simply be written upon a whiteboard, chalk board, printed menu, or other visually viewable medium of the physical establishment. The patron may then view the password, type it into his or her portable computing device, and then be enabled to add media items to the current playlist for that localized physical establishment. Such a password method, whether the password is conveyed to the patrons electronically or visually, may be employed to prevent people who are not current patrons (i.e., who are not currently within or recently visited the localized physical establishment) to add media items to the playlist for that establishment.

It should be appreciated that in some embodiments only users who have a certain status level may be enabled to send electronic rating messages. For example, only users who have made at least one selection for an establishment may be enabled to send rating messages for that establishment. In another embodiment only users who have set up an account with the establishment media server may send an electronic rating message. It should also be noted that in some embodiments the musical media is automatically selected by an intelligent process, not by other patrons, with the patrons only acting to rate playing media.

In some embodiments the portable computing device 100 includes an RFID scanner and may receive the unique ID for a particular establishment from an RFID chip that is physically located upon the premises of the establishment. A unique password may also be conveyed in this way.

Thus, embodiments of the present invention enable a plurality of other patrons with a localized physical establishment to provide subjective rating data as to their partiality towards a musical media file that has been selected for play by another patron or has been selected for play by an automated or scripted process. In this way, a plurality of patrons, upon hearing a selected piece of musical media play within a localized physical establishment, may each independently enter subjective rating data into their own portable computing devices, either by typing in data or by interacting with a GUI interface upon their portable computing device 100, and have a representation of their subjective rating data be communicated as an electronic message to the establishment media server 199. The establishment media server 199 may thereby receive subjective rating data from each of a plurality of other patrons, the subjective rating data relating to a currently playing media file within a particular physical establishment. In some embodiments the subjective ratings provided by each patron may be a binary rating value that indicate if the patron's partiality towards the currently playing media file is either favorable or unfavorable. In some embodiments the subjective ratings provided by the other patrons are analog rating values that indicate the patrons partiality on a rating scale, for example from 0 to 10, that represents a range of subjective ratings towards the musical piece from unfavorable to favorable.

The establishment media server 199 receives such a plurality of subjective rating data messages from each of a plurality of other patrons, and computes a statistical result, the statistical result reflecting the partiality of the group of other patrons towards the currently playing media file. For example, the statistical result may reflect the average, mean, or median subjective rating across the group of other patrons who provided subjective rating data. Alternately, the statistical result may reflect the percentage of other patrons who rated the musical piece favorably and/or the percentage of other patrons who rated the musical piece unfavorably.

After a statistical result is computed by the establishment media server, a representation of the statistical result is sent as an electronic message to the patron who suggested the musical media piece for play and/or to each of the other patrons who provided subjective rating data about their partiality towards the playing musical media piece. A representation of the statistical result is then displayed to the patron who suggested the musical media piece for play and/or to each of the other patrons who provided subjective rating data about their partiality towards the playing musical media piece on their personal portable computing devices. In this way the patrons who receive the representation of the statistical result are informed as to the collective partiality towards the playing musical media piece among a group of patrons of the establishment.

Figure 4:
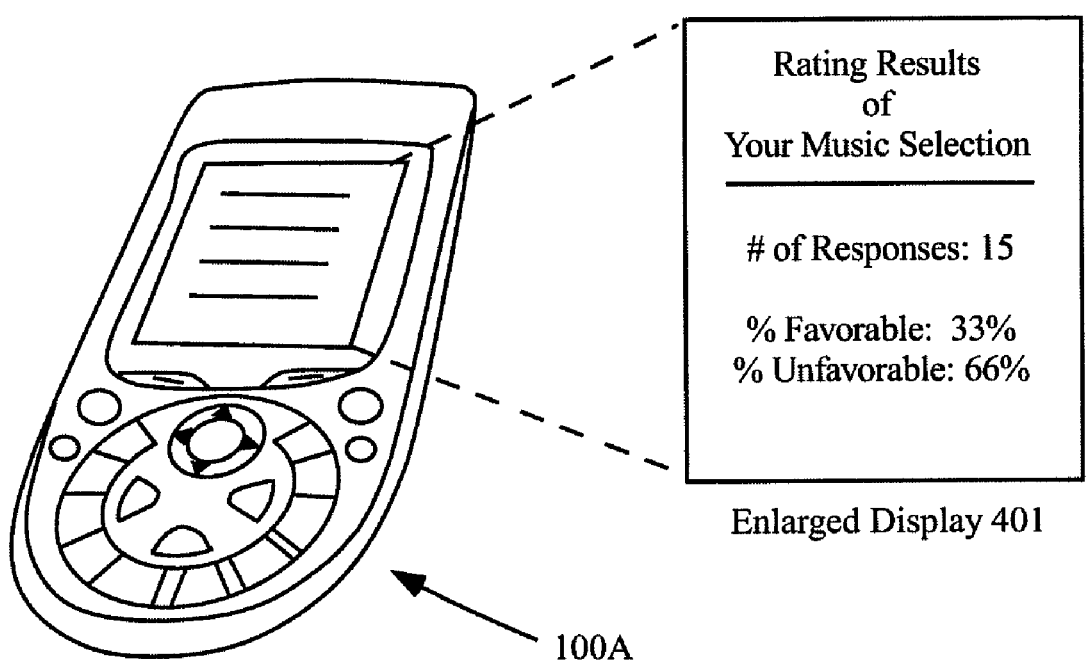
FIG. 4 illustrates an example display screen presented to a user who selected a song for play within a particular physical establishment according to an embodiment of the invention.
Figure 5:
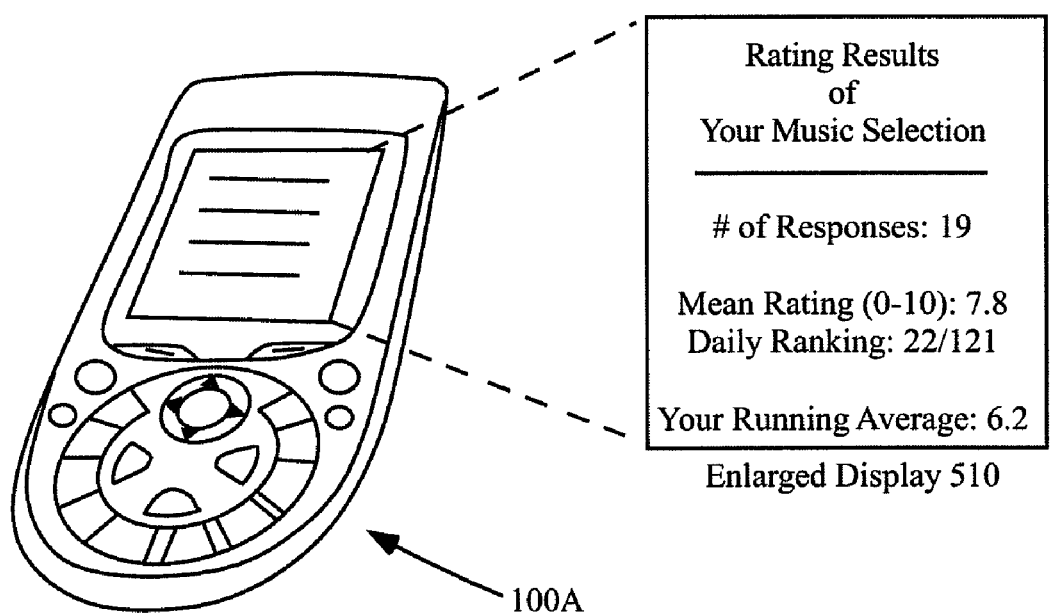
FIG. 5 illustrates an example display screen presented to a user who selected a song for play within a particular physical establishment according to an embodiment of the invention.

The statistical result may be displayed as a standard text message upon the screen of the portable computing devices 100A,B,C of the patrons who receive a representation of the statistical result from the establishment media server. For example, the text message may simply include a string such as "88% favorable, 12% unfavorable" indicating the percentage breakdown, for example, of a binary rating. Alternately the portable computing devices 100A,B,C may run a local application that receives a coded message from the establishment media server and displays in textual and/or graphical format a representation of the statistical result. FIGS. 4 and 5 illustrate how that formatted display may be presented to users according to an embodiment of the invention.

FIG. 4 illustrates an example display screen presented to a user who selected a song for play within a particular physical establishment according to an embodiment of the invention. In this example scenario, once the selected song began to play within the establishment, a plurality of other patrons sent electronic rating messages to the establishment media server. The establishment media server, in this example, received a total of 15 rating messages from unique users, as identified by their unique phone numbers or other unique device addresses. The establishment media server computed a statistical result of the 15 rating messages and conveyed a representation of the statistical result back to the portable computing device of the user who made the media selection. In this example, the rating messages were binary in nature, indicating favorability or unfavorability towards to the playing media file. Of the 15 received responses, 5 were favorable and 10 were unfavorable. Thus the establishment media server computed a statistical result that approximately 33% of the rating responses were favorable and approximately 66% of the rating responses were unfavorable. A representation of this statistical result was sent from the establishment media server 199 to the portable computing device 100 of the user who selected the musical media piece for play. Software running upon the portable computing device 100, used the representation of the statistical result to display the screen shown as element 401 in FIG. 4. As shown in element 401 in FIG. 4, the screen display indicates to the user that there were 15 subjective rating responses received form unique users in response to the media selection. As also shown in element 401 of FIG. 4, the screen display indicates to the user that 33% of the subjective rating responses were favorable and 66% of the subjective rating responses were unfavorable. In some such embodiments, the display screen is presented once upon completion of play of the musical media piece. In other such embodiments the display screen is updated numerous times during the play of the musical media piece as the statistical result is updated in response to incoming subjective rating data. Either way, the information displayed at 401 upon portable computing device 100A of the patron who selected the musical media piece for play within the physical establishment is highly informative to that user, providing that user with feedback as to the collective partiality towards his musical selection among other patrons within the establishment.

FIG. 5 illustrates an example display screen presented to a user who selected a song for play within a particular physical establishment according to an embodiment of the invention. In this example scenario, once the selected song began to play within the establishment, a plurality of other patrons sent electronic rating messages to the establishment media server. The establishment media server in this example received a total of 19 rating messages from unique users, as identified by their unique phone numbers or other unique device addresses. The establishment media server computed a statistical result of the 19 rating messages and conveyed a representation of the statistical result back to the portable computing device of the user who made the media selection. In this example, the rating messages were analog in nature, indicating a level of favorability towards to the playing media file on a scale of 0 to 10, with 0 being the lowest and 10 being the highest. Among the 19 received responses, the mean rating value was 7.8. Thus, the establishment media server computed a statistical result by determining the mean rating across the 19 responses received, a representation of this statistical result being sent from the establishment media server 199 to the portable computing device 100 of the user who selected the musical media piece for play. Software running upon the portable computing device 100 used the representation of the statistical result to display the screen shown as element 501 in FIG. 5. As shown in element 501 in FIG. 5, the screen display indicates to the user that there were 19 subjective rating responses received form unique users in response to the media selection. As also shown in element 501 of FIG. 4, the screen display indicates to the user that the mean rating received across the 19 subjective rating responses was 7.8 on a scale of 0 to 10. In some such embodiments, the display screen is presented once upon completion of play of the musical media piece. In other such embodiments the display screen is updated numerous times during the play of the musical media piece as the statistical result is updated in response to incoming subjective rating data. Either way, the information displayed at 501 upon portable computing device 100A of the patron who selected the musical media piece for play within the physical establishment is highly informative to that user, providing that user with feedback as to the collective partiality towards his musical selection among other patrons within the establishment.

FIG. 5 also displays a Daily Ranking value as "22/121." This indicates that the mean rating value for the media file (which was 7.8 as described above), places the rating of the media file as the 22nd highest rated song of the 121 songs that were played thus far today in that particular establishment. This ranking is determined by the establishment media server, which stores data as to the subjective ratings received from patrons over periods of time. For example, the establishment media server may be configured to store the statistical result of subjective rating data received with respect to each played media file within a particular establishment over a particular period of time such as the current day, week, or month. This data may then be used to rank each newly rated song among the other songs that were rated over a particular period of time within a particular establishment. In this way, for example, the establishment media server may determine the ranking of the played media file with respect to subjective rating data as compared to the rating data received for all other songs played in the particular establishment during the current day. In this example the ranking was 22 out of 121. A representation of this ranking is then sent from the establishment media server 199 to the portable computing device 100A and is displayed as shown in box 510. It should be appreciated that although the example shown in FIG. 5 is with respect to a daily ranking, other time periods may be employed including weekly rankings and/or monthly rankings and/or yearly rankings.

Also displayed in the example screen of FIG. 5 is a Running Average value that is displayed in box 501 as "6.2." This indicates to the user who selected the particular song, the average rating value he or she has received in response to other song selections made by that user over a period of time. This is accomplished by the establishment media server 199 maintaining a data file for each user, where the data file stores the statistical result rating values generated in response to media selections made by that user. Thus, if a user had made 40 media selections within establishments over the past year, the establishment media server may be configured to store the statistical results of ratings of each of those selections in a data file associated with the given user. In this way the establishment media server may track over time the rating results achieved by particular users as they select media for play in public establishments. In addition, the establishment media server may compute the average, mean, median, or other statistical central tendency of the feedback results received in response to that user's media selections. In this particular example the establishment media server determined that of the 40 songs selected by the particular user within establishments over the past year, the average statistical rating result received from other patrons was a 6.2 on a scale of 0 to 10. This data indicates how well, over time, that user's selections were received by other patrons. A representation of this result may be sent by the establishment media server 198 to the portable computing device 100A of the particular user and a representation of this result may be displayed upon the screen of the portable computing device. Thus, as shown in box 510 of FIG. 5, the running average is displayed to the user as a value of 6.2, thereby informing the user as to how well his or her media selections have been received by other patrons within physical establishments over an extended period of time.

Thus, as described above, the establishment media server may be configured to store data over time reflective of the subjective rating results from patrons who rate songs playing within establishment. In some embodiments the establishment media server may store, for each particular establishment, a history of the rating results for music selections within that establishment. In some such embodiments the establishment media server may use this data store to compute a ranking of song ratings, thereby indicating from most favorably ranked to least favorably ranked, the songs that have been played within the establishment over a period of time. In addition, the establishment media server may store, for each particular unique user (or unique portable computing device), a history of the rating results for music selections made by that user (or portable computing device). In some such embodiments the establishment media server may use this data to compute a central tendency, such as an average, of the rating results for music selections made by that user over a period of time. In this way a user may be characterized as to his or her ability to select songs that are favorably or unfavorably received by other patrons. In some such embodiments, the establishment media server may be configured to reward users who select songs that are favorably received by other patrons. For example, the establishment media server may be configured to award free credits (that may be used for future song selections) to a particular user in response to that user having made past song selections generating favorable subjective rating data from other patrons. This provides an incentive for patrons to select songs that they believe other patrons will enjoy.

In one such embodiment, free credits are awarded to a particular user in response the mean subjective rating data provided in response to the last 10 musical media file selections being made by that user being above a certain threshold value, for example being above an 8.5 on a scale of 1 to 10. Thus is a particular user made 10 musical media file selections within establishments using an embodiment of the present invention, the establishment media server may be configured to compute the mean statistical result of subjective rating feedback generated across each of the 10 musical media file selections made by that user. If the mean statistical result is greater than an 8.5, meaning that on average the user's selections were rated more than 8.5 by other patrons across his or her last 10 musical selections, that user is awarded a free credit for a music selection by the establishment media server.

In an example usage scenario, a first patron may select a first song for play within a first establishment by sending an SMS text message to the establishment media server, where the SMS message encodes an indication of the desired song by unique media ID value and an indication of the desired establishment by unique establishment ID. A plurality of second patrons may provide subjective rating data about the first song while it plays within the first establishment by each sending an SMS text message to the establishment media server while the first song plays within the establishment, the SMS text message may include an indication as to which establishment the rating value relates to, by unique establishment ID, as well as an indication of the rating value. For example, the text message may include a coded value R07 which means the user rates the song a 7 on a scale of 0 to 10, with 0 being the lowest partiality towards the song and 10 being the highest partiality towards the song. Alternatively, the text message may include a coded value "TU" that stands for "Thumbs Up," indicating a binary indication of satisfaction towards the currently playing song within the designated establishment. Alternately, the coded value "TD" may be used, standing for "Thumbs Down" and indicating a binary indication of dissatisfaction towards the currently playing song within the designated establishment.

The establishment media server thus receives a plurality of subjective rating messages from each of a plurality of other users while the first song is playing and computes a statistical result. The statistical result may be, for example, a computation that 75% of the other patrons rated the song favorably and 25% of the other patrons rated the song unfavorably. Alternately, the statistical result may be, for example, a computation that the mean subjective rating value across the other patrons was a rating of 7.8 on scale of 1 to 10, with 1 being the least favorable rating and 10 being the most favorable rating. The establishment media server may store a representation of the statistical result, indexed with respect to the song it relates and/or indexed with respect to the establishment it was rated within and/or indexed with respect to the user who selected the song for play. Such data may be stored in a historical data store accessible to the establishment media server.

Next, the establishment media server sends a representation of the statistical result for the currently playing media file to the first patron for selected the song and/or to a plurality of the other patrons who rated the song, each of their portable computing devices displaying a representation of the statistical result. In this way, the first patron and/or a plurality of the other patrons are informed as to the statistical distribution of partiality towards the selected song among the plurality of other patrons who provided subjective rating data within the particular establishment. This is fun and interesting to patrons of a localized physical establishment, for example enabling a first patron of the establishment to select a song for public play within the establishment, and then enabling that first patron to be provided within feedback as to the favorability and/or unfavorability of his or her selection to a plurality of other patrons within the establishment. This feedback is highly interesting and entertaining to both the first patron who made the selection as well as the plurality of other patrons who provided the subjective rating data feedback. In addition, the patron who selects a song may be provided with data from the establishment media server that indicates how the collective partiality towards the selected song compares with the collective partiality towards other songs that have been selected in the past within the particular establishment. For example, the establishment media server may determine a ranking of the selected song with respect to collective partiality as compared to other songs. In this way, the first patron, and/or the plurality of other patrons, may be informed through an electronic message from the establishment media server, how the selected song was rated as compared to how other songs were rated within the establishment. The data might indicate, for example, that the selected song was the 7th most favorably rated song of the 65 songs thus far selected by patrons within the establishment during a particular time period, for example the current day.

Finally, it should be appreciated that the process described above, which enables a plurality of individual patrons to provide subjective rating data as to their partiality towards a currently playing song within a localized physical establishment, may be used by establishment media server to compile personal profile data for each of the plurality of other patrons. This is achieved by maintaining a historical data store for each user who provides subjective rating data about playing media files in establishments over a period of time. This data store, collected over time and indexed with respect to a particular user, will reflect that user's partiality towards a plurality of particular songs, particular artists, particular albums, and/or particular genres, as indicated by the rating data provided by that user in regard to particular songs on particular albums by particular artists of particular genres. Examples of how such subjective rating data may be collected stored in memory and used to represent a user's partiality towards a piece of musical media is disclosed in co-pending patent application Ser. Nos. 11/223,386 and 11/267,079 by the present inventor, the disclosures of both of which are herein incorporated by reference.

It should be appreciated that in many embodiments the establishment media server maintains a rating flag or other value stored in memory to keep track of which users have provided ratings to a song currently playing within a particular establishment. For example, the establishment media server may maintain in memory a listing of the phone numbers or other unique electronic addresses of each portable computing device from which a rating is received with respect to a particular song playing within a particular establishment. By cross-checking against such a listing, the establishment media server may ensure that only one rating value may be submitted from a particular portable computing device for a particular play of a particular song within a particular establishment. This can be used to prevent users from providing multiple ratings and thereby skew the results. Instead of keeping track of phone numbers of unique device addresses of users who provide ratings to particular songs playing within particular establishments, the establishment media server may keep track of the user IDs of users who provide ratings. Either way, such a data store can be used to ensure that each user (or each portable computing device of a user) may only provide one rating for a particular play of a particular song within a particular establishment.

The foregoing described embodiments of the invention are provided as illustrations and descriptions. They are not intended to limit the invention to precise form described. In particular, it is contemplated that functional implementation of the invention described herein may be implemented equivalently in hardware, software, firmware, and/or other available functional components or building blocks.

Other embodiments, combinations and modifications of this invention will occur readily to those of ordinary skill in the art in view of these teachings. Therefore, this invention is not to be limited to the specific embodiments described or the specific figures provided. This invention has been described in detail with reference to various embodiments. Not all features are required of all embodiments. It should also be appreciated that the specific embodiments described are merely illustrative of the principles underlying the inventive concept. It is therefore contemplated that various modifications of the disclosed embodiments will, without departing from the spirit and scope of the invention, be apparent to persons of ordinary skill in the art. Numerous modifications and variations could be made thereto by those skilled in the art without departing from the scope of the invention set forth in the claims.

What is claimed is:

1. A method for enabling collaborative rating of musical media in a physical environment, the method comprising:
   receiving media selection data over a wireless communication link from a first portable computing device of a first user, the media selection data indicating a piece of musical media content for requested play within the physical environment;
   playing the piece of musical media content over an audio system within the physical environment, the playing being based at least in part upon the received media selection data;
   receiving subjective rating data over a wireless communication link from each of a plurality of portable computing devices, the subjective rating data from each portable computing device indicating a subjective partiality that a user of that portable computing device has towards the piece of musical media content currently playing within the physical environment, wherein the subjective rating data received over the wireless communication link from each of the plurality of portable computing devices includes a unique identifier that indicates a particular physical environment to which the rating relates;
   computing a statistical result based upon the subjective rating data received from the plurality of portable computing devices, the statistical result indicating a central tendency of partiality towards the piece of musical media content across a plurality of users of the plurality of portable computing devices; and
   providing a representation of the statistical result to the first user as an electronic message sent via a wireless communication link to the first portable computing device.

2. The method of claim 1 wherein the subjective rating data received from each portable computing device comprises at least one binary rating value indicating either favorable or unfavorable partiality towards the piece of musical media content currently playing within the physical environment.

3. The method of claim 1 wherein the subjective rating data received from each portable computing device comprises at least one analog rating value indicating a level of partiality towards the piece of musical media content currently playing within the physical environment.

4. The method of claim 1 wherein the statistical result indicates at least one of an average and a median subjective rating of the piece of media content across the plurality of users.

5. The method of claim 1 further comprising providing to the first user as an electronic message sent over a wireless communication link, an indication of a number of the users that provided subjective rating data regarding the piece of musical media content.

6. The method of claim 1 further comprising providing a representation of the statistical result, as an electronic message sent over a wireless communication link, to each of the plurality of portable computing devices that provided subjective rating data.

7. The method of claim 1 further comprising providing an indication of the number of users that provided subjective rating data regarding the piece of musical media content, as an electronic message sent over a wireless communication link, to each of the plurality of portable computing devices that provided subjective rating data.

8. The method of claim 1 wherein the subjective rating data is received from each of the plurality of portable computing devices as an SMS message.

9. The method of claim 1 wherein the statistical result is provided as an SMS message.

10. A system for enabling the collaborative rating of musical media content playing within a localized physical establishment, the system comprising:
a media player configured to play a series of musical media pieces within a localized physical establishment, the series of musical media pieces including a current musical media piece that is currently being played within the localized physical establishment;
a plurality of portable computing devices, each of the plurality of portable computing devices being associated with a corresponding one of a plurality of users, the plurality of portable computing devices being adapted to provide, in response to user input, subjective rating data indicating a partiality of the one of the users towards the current musical media piece playing within the localized physical establishment;
a server configured to:
receive, from each of the plurality of portable computing devices over a wireless communication link, the subjective rating data regarding the current media piece playing within the localized physical establishment, wherein the subjective rating data received from each of the plurality of portable computing devices includes a unique identifier that indicates the particular localized physical establishment to which the rating relates;
compute a statistical result based on the received subjective rating data, the statistical result indicating a central tendency of partiality towards the current musical media piece across the plurality of users; and
provide a representation of the statistical result as an electronic message sent over a wireless communication link, to at least one of the plurality of portable computing devices.

11. The system of claim 10 wherein the subjective rating data received from each portable computing device comprises a binary rating value indicating either favorable or unfavorable partiality towards the piece of musical media content currently playing within the physical environment.

12. The system of claim 10 wherein the subjective rating data received from each portable computing device comprises at least one analog rating value indicating a level of partiality towards the piece of musical media content currently playing within the physical environment.

13. The system of claim 10 wherein the server is further configured to provide over a wireless communication link, an indication of the number of users that provided subjective rating data regarding the piece of musical media content, to at least one of the plurality of portable computing devices.

14. The system of claim 10 wherein the subjective rating data is received from each of the plurality of portable computing devices as an SMS message.

15. The system of claim 10 wherein the representation of the statistical result is provided as an SMS message.

16. The system of claim 10 wherein the server is further configured to compile media taste data for each of the plurality of users based on the subjective rating data received from each of the plurality of portable computing devices, the media taste data for each user indicating that user's partiality towards at least one of a plurality of musical songs, musical artists, musical albums, and musical genres.

17. A system for enabling the collaborative rating of musical media content playing within a localized physical establishment, the system comprising:
a plurality of portable computing devices, each of the plurality adapted to provide, in response to a user's input, a subjective rating value indicating the user's partiality towards a current musical media piece playing within a localized physical establishment; and
a server configured to:
receive, from each of the plurality of portable computing devices over a wireless communication link, the subjective rating value regarding the current musical media piece playing within the localized physical establishment, wherein the subjective rating data received from each of the plurality of portable computing devices includes a unique identifier that indicates the particular localized physical establishment to which the rating relates;
compute a statistical result based on the received subjective rating values, the statistical result indicating a central tendency of partiality towards the current musical media piece across the plurality of rating values received; and
provide a representation of the statistical result as an electronic message sent over a wireless communication link, to each of the plurality of portable computing devices.

18. The system of claim 17 wherein the server is further configured to provide, as an electronic message sent over a wireless communication link to each of the plurality of portable computing devices, a representation of the number of rating values used in the computation of the statistical result.

* * * * *

UNITED STATES PATENT AND TRADEMARK OFFICE
CERTIFICATE OF CORRECTION

PATENT NO.         : 7,917,148 B2
APPLICATION NO.    : 11/871966
DATED              : March 29, 2011
INVENTOR(S)        : Rosenberg It is certified that error appears in the above-identified patent and that said Letters Patent is hereby corrected as shown below:

In the CLAIMS:
Claim 10, column 23, line 23, delete "playa" and insert --play a--.

Signed and Sealed this
Seventh Day of June, 2011

David J. Kappos
*Director of the United States Patent and Trademark Office*